United States Patent [19]

Saslove

[11] 4,157,628
[45] Jun. 12, 1979

[54] RAT TRAP

[76] Inventor: Moe Saslove, 1889 Wingate, Bloomfield Hills, Mich. 48013

[21] Appl. No.: 877,376

[22] Filed: Feb. 13, 1978

[51] Int. Cl.² .......................................... A01M 23/08
[52] U.S. Cl. ..................................................... 43/65
[58] Field of Search ................... 43/58, 60, 64, 65, 66, 43/69, 131

[56] References Cited

U.S. PATENT DOCUMENTS

| | | | |
|---|---|---|---|
| 1,220,743 | 3/1917 | Harriman | 43/60 |
| 1,407,861 | 2/1922 | Hiett | 43/69 |
| 1,538,707 | 5/1925 | Krause | 43/69 |
| 1,689,529 | 10/1928 | Knapp | 43/65 |
| 2,234,983 | 3/1941 | Russell | 43/69 |
| 2,775,844 | 1/1957 | Barnes | 43/69 |
| 2,835,070 | 5/1958 | Gomez | 43/69 |

Primary Examiner—Nicholas P. Godici
Attorney, Agent, or Firm—Cullen, Sloman, Cantor, Grauer, Scott & Rutherford

[57] ABSTRACT

A trap for rats and the like rodents formed of a sheet metal, covered box having an opening in one wall and a steep ramp located within the box and extending from the bottom of the opening to a point just below the cover of the box. A vertically arranged sheet metal channel surrounds the ramp to form a ramp containing chamber located within the box, which isolates the ramp from the remainder of the box interior. Bait is suspended within the box near the upper end of the ramp to entice the rodent into climbing up the ramp and reaching for the bait, thereby causing the rodent to fall into and to be trapped within the box interior.

1 Claim, 5 Drawing Figures

RAT TRAP

BACKGROUND OF THE INVENTION

In an effort to control or eliminate rats and other similar rodents, various types of poisons and traps have been utilized. For certain purposes, poisons are not an acceptable or desirable control means since frequently these act upon the rodents and cause their expiration at places where their carcasses are not readily reached for removal. Likewise, prior types of traps which have been used, particularly those which kill or injure the animal at the trap, have been undesirable in many areas since they tend to alert other rodents to avoid the trap.

Hence, it is desirable in certain areas of rodent control to utilize traps which catch the rodents alive for subsequent disposal. In many farm or food storage operations this sort of trap is particularly useful.

Traps of the type which catch animals live, have in the past been relatively expensive or complex or required periodic maintenance. Hence, the invention herein concerns a simplified trap for catching rodents live which trap is virtually maintenance free, is easy to clean and which may be utilized with minimal attention.

SUMMARY OF INVENTION

The invention herein contemplates forming a rodent trap for catching rats and the like, which trap is formed of a simple, relatively large, smooth wall box formed of a material such as sheet metal, and containing, within the box, a ramp running from an opening in a wall of the box upwardly to just below the top of the box, which ramp is isolated from the remainder of the interior of the box by a smooth surrounding wall. A rod located within the interior of the main portion of the box supports a bait so that rodents are enticed to run up the ramp, within the ramp containing chamber and then in reaching for the bait, fall over the top of the ramp and into the box where they are caught and are unable to escape back over the ramp.

Except for renewing the bait periodically and removing the rodents which are caught, such as by taking the box to a remote area for destroying the rodents therein and then cleaning out the box, virtually no maintenance is required.

The only moving parts of the trap are the cover which can be opened for access to the bait and replacement of bait. Also the ramp itself is preferably loosely installed and supported only at its upper end so that it can be removed and separately hosed down or otherwise cleaned so as to avoid odors or debris thereon which might repel rather than attract the rodents.

Preferably the ramp is formed of a single long flat strip of sheet metal whose upper end is bent downwardly so that it is suspended at its upper end over the upper end of a wall forming channel which provides the ramp chamber. The upper surface of the otherwise smooth sheet metal ramp may be suitably roughened as for example by welding or otherwise fastening a wire mesh upon its surface to give the rodent a foothold. In addition, the ramp is preferably spaced, at its edges, away from the surrounding channel walls forming the ramp chamber and is otherwise relatively loose within the box so that the rodent is not alerted to cause it to refuse to run up the ramp.

One objective of the invention herein is to provide a simplified trap formed of a simple, easy to maintain box with all parts contained within the box, for simplicity in use, minimum maintenance and deterioration and maximum effectiveness at the lowest possible cost. Such a trap is particularly useful in farms, warehouses and other places where food might be stored and where it is desirable to remove trapped animals without permitting injured or poisoned animals to possibly escape from the trap or otherwise return to their hiding places or lairs.

These and other objects and advantages will become apparent upon reading the following description, of which the attached drawings form a part.

DETAILED DESCRIPTION

Figure 1:
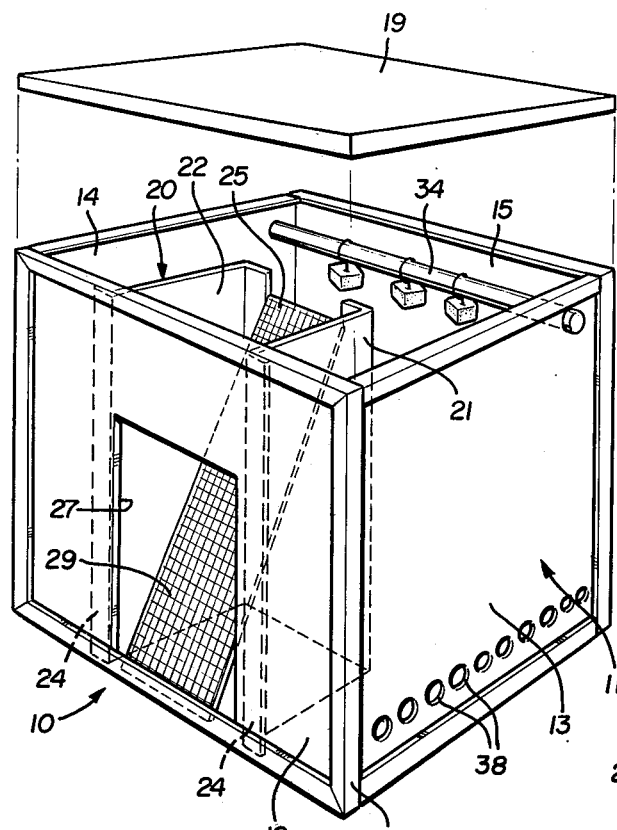
FIG. 1 is a perspective view of the trap, with the cover lifted above the trap for a view of the interior.

The rodent trap, generally designated as 10, is formed of a box 11 having a front wall 12, side walls 13 and 14, a rear wall 15 and a floor 16. The walls and floor are preferably formed of relatively stiff sheet metal of a type which is resistant to weathering and having a smooth surface to form a smooth interior box. The box is preferably reinforced and assembled by first providing a frame 17 formed of angle iron strips welded together to form a box-like structure within which the walls are suitably fastened as by welding or mechanical fasteners.

A cover 19 may be either removably positioned upon the top of the box or alternatively may be hinged (not shown) in a conventional manner to the box for opening.

Although the size of the box may vary considerably, an example of a suitably sized box would be one on the order of about roughly 2 feet by 2 feet by 2½ feet in height.

Figure 5:
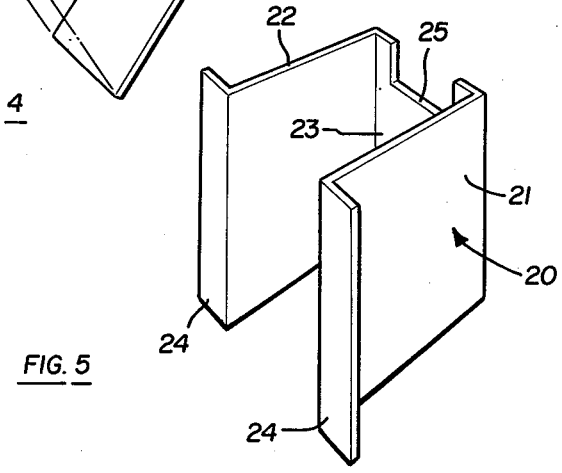
FIG. 5 is a perspective view, to a smaller scale, of the channel which forms the ramp chamber.
Figure 3:
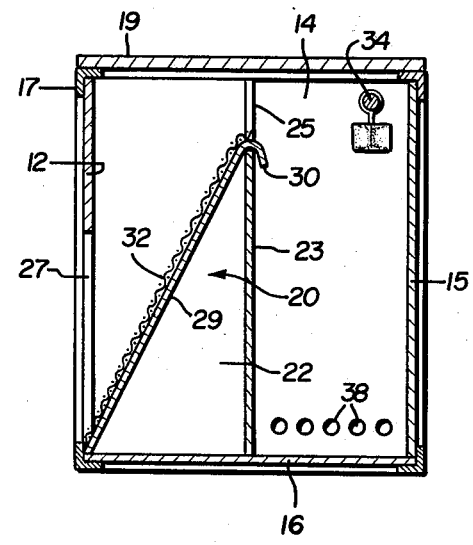
FIG. 3 is a cross-sectional view taken in the direction of arrows 3—3 of FIG. 2, showing an elevational view.

The interior of the box is divided into a ramp chamber and a rodent trapping chamber by means of a vertical channel 20 which is formed of a large sheet of stiff sheet metal bent into the form (see FIG. 5) of opposed, parallel side walls 21 and 22 connected by a rear or base wall 23 and having oppositely bent flanges 24 on the free edges of the side walls. A squared notch 25 is formed on the upper edge of the base wall 23.

The channel is located about an opening 27 formed in the front wall, preferably at the center of the front wall as illustrated in FIG. 1. Thus, the flanges 24 of the channel abut the interior surface of the front wall and are secured thereto as by welding or screws or the like so as to be permanently installed therein.

The channel extends for about the full height of the box with the notch 25 thus forming a space or opening just beneath the box cover.

Arranged within the channel is a ramp 29 which is preferably formed of a long strip of sheet metal arranged at an acute angle, with its upper edge bent into a flange 30 to provide an inverted V-shape arrangement which rests upon the base of the notch 25 of the channel. The lower end of the ramp is simply loosely abutted against the frame strip portion which is located at the opening 27 of the front wall 12.

In order to roughen the upper surface of the ramp, a mesh 32, as for example, of conventional wire cloth may be welded or otherwise fastened to the ramp to thereby provide a foothold for the rodent.

Figure 2:
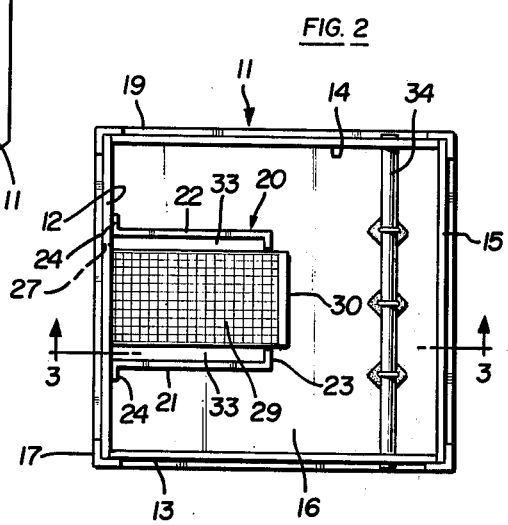
FIG. 2 is a top, plan view of the trap, with the cover removed.
Figure 4:
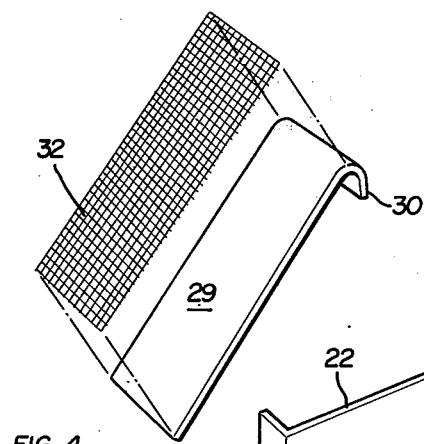
FIG. 4 is a perspective view of the ramp with its mesh covering removed.

The sheet metal strip forming the ramp is considerably narrower than the space between the two walls 22 and 21 forming the channel 20 so as to provide a gap 33 between the ramp edges and the adjacent walls (see FIG. 2). The purpose for this is to permit the ramp to be loosely supported by its upper V-shape arrangement and otherwise to be gapped away from the wall so that a rodent running upon it feels the ramp as being relatively loose and movable or flexible under its feet and otherwise unconfined, which is more nearly like the types of surfaces the rodent would be running on inside of a barn or warehouse or the like.

Once the rodent reaches the upper edge of the ramp, he falls over the top of the ramp into the remainder of the chamber of the box where he is trapped until otherwise removed.

In order to entice the rodent to run up the ramp and to reach into it so as to lose its balance and fall into the box, bait is suspended within the box. The means for supporting the bait comprises a cross bar 34 whose opposite ends are fastened either directly to the side walls 13 and 14 of the box or suspended in brackets (not shown) fastened to such side walls. Bait containing boxes 35 or pieces of bait in the form of meat are supported by wires 36 from the cross bar 34.

Where boxes are used, small sheet metal boxes having perforations and an openable top or bottom, may be stuffed full of a pungent bait material, such as meat, so that the odor attracts the rodent up the ramp and causes the rodent to reach across the space over the top of the ramp towards the bait where it ultimately will lose its balance and fall into the box.

In addition, holes 38 may be formed in the sheet metal walls of the box, particularly at the lower ends of the side walls and rear wall, both for permitting odors to escape from the box to attract rodents as well as to simplify cleaning the box as by hosing it down.

Rodents collected in the trap can be disposed of from time to time. When the trap is unattended for some while, trapped rodents tend to die within the trap, such as from starvation and their carcasses may be disposed of. Alternatively, if still alive, they can be destroyed by suitable means within the trap and then the carcasses removed and the trap cleaned by hosing it down and thereby preparing it for use again.

Having fully described an operative embodiment of this invention, I now claim:

1. A rodent trap comprising a sheet metal box having interconnected front, rear and side walls, a floor, and a cover with the walls having relatively smooth interior surfaces;

an opening in the front wall at the bottom thereof, and a ramp arranged within the box and extending from the bottom of such opening upwardly and inwardly of the box and terminating a short distance beneath the cover, with the ramp being arranged at an acute angle relative to the vertical and a wire mesh fastened upon the upper surface of the ramp for roughening the ramp surface to enable a rodent to gain a foothold thereon;

the space between the side edges of the ramp and the front wall being closed off relative to the remainder of the box by a separate ramp containing chamber within the box, said ramp containing chamber comprising vertically arranged sheet metal panels arranged at the edges of the ramp, within the box, and extending substantially the full height of the box for isolating the ramp upper surface from the remainder of the interior of the box, except at the upper edge of the ramp, said panels including parallel side wall panels connected by a rear wall panel, said paralel side wall panels and rear wall panel being spaced inwardly of said side walls and rear wall of said box, said side wall panels having oppositely bent flanges which are secured to the interior surface of said front wall, a notch formed in the upper edge of said rear wall panel, said ramp having its upper edge bent into an inverted V-shape for loosely engaging over the base of said notch of said rear wall panel, with the ramp being otherwise unconnected to the box and thereby being manually removable from the box when desired;

and bait supporting means located within the box, a short distance below the cover and a sufficient distance rearwardly of the upper edge of the ramp to attract a rodent, such as a rat, but just beyond its reach when it is positioned upon the ramp upper edge said bait supporting means comprising a rod extending transversely of the side walls of the box, with means for securing the rod ends to said side walls, and with the rod being spaced between the upper edge of the ramp and the rear wall of the box and including bait support means for suspending bait from the rod;

whereby a rodent will enter the opening in the front wall, climb up the ramp and attempt to reach the bait from the upper edge of the ramp and thereby fall into the box, wherein it will be trapped within the box due to its inability to climb up the smooth interior wall surfaces to regain the upper edge of the ramp.

* * * * *